United States Patent
Luo et al.

(10) Patent No.: US 11,619,745 B2
(45) Date of Patent: Apr. 4, 2023

(54) CAMERA-BASED GNSS ENVIRONMENT DETECTOR

(71) Applicant: QUALCOMM Incorporated, San Diego, CA (US)

(72) Inventors: Ning Luo, Cupertino, CA (US); Gengsheng Zhang, Cupertino, CA (US); Bo Zheng, Sunnyvale, CA (US); Yinghua Yang, San Jose, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 16/666,848

(22) Filed: Oct. 29, 2019

(65) Prior Publication Data

US 2021/0124057 A1    Apr. 29, 2021

(51) Int. Cl.
*G01S 19/21* (2010.01)
*G06T 7/73* (2017.01)
(Continued)

(52) U.S. Cl.
CPC ............ *G01S 19/21* (2013.01); *G01S 19/06* (2013.01); *G01S 19/258* (2013.01); *G01S 19/28* (2013.01);
(Continued)

(58) Field of Classification Search
CPC ...... G01S 19/06; G01S 19/252; G01S 19/258; G01S 19/28; G01S 19/46; G01S 19/48; G06T 7/74
See application file for complete search history.

(56) References Cited

U.S. PATENT DOCUMENTS

| 8,717,233 B2 * | 5/2014 | Ashjaee | G01S 19/22 |
| | | | 342/357.25 |
| 9,408,175 B2 | 8/2016 | MacGougan et al. | |

(Continued)

FOREIGN PATENT DOCUMENTS

| CN | 101194143 B | * | 10/2012 |
| CN | 107064974 A | * | 8/2017 |

(Continued)

OTHER PUBLICATIONS

Inertial navigation system. (1992). Academic Press Dictionary of Science and Technology (4th ed.). Elsevier Science & Technology. Credo Reference: https://search.credoreference.com/content/entry/apdst/inertial_navigation_system/0 (Year: 1992).*

(Continued)

*Primary Examiner* — Bernarr E Gregory
*Assistant Examiner* — Fred H Mull
(74) *Attorney, Agent, or Firm* — Thien T. Nguyen

(57) ABSTRACT

Techniques for enhanced Global Navigation Satellite Systems (GNSS) position determination can include capturing an image, from a camera, of obstructions near a mobile device. Orientation information regarding the camera can be used to determine where, in the image, the horizon is situated, and which portions of the sky are blocked by the obstructions from the perspective of the mobile device. Information regarding the location of satellites in the sky is obtained, based on an estimated position of the mobile device. Obstructed satellites can then be identified by comparing the location of the satellites with the obstructed portions of the sky. In a GNSS position determination, information received from the obstructed satellites can then be disregarded or de-weighted accordingly. In some embodiments, the information regarding the blocked portions of the (Continued)

sky can be sent to a server and/or shared with other nearby mobile devices.

30 Claims, 9 Drawing Sheets

(51) Int. Cl.
  *G01S 19/06* (2010.01)
  *G01S 19/25* (2010.01)
  *G01S 19/28* (2010.01)
  *G01S 19/46* (2010.01)
  *G01S 19/48* (2010.01)

(52) U.S. Cl.
  CPC .............. *G01S 19/46* (2013.01); *G01S 19/48* (2013.01); *G06T 7/74* (2017.01)

(56) References Cited

U.S. PATENT DOCUMENTS

| | | | |
|---|---|---|---|
| 9,606,238 B2 * | 3/2017 | Carter | ..................... G01S 19/28 |
| 10,495,762 B2 | 12/2019 | Niesen et al. | |
| 2014/0070991 A1 * | 3/2014 | Liu | ....................... G01S 19/428 |
| | | | 342/357.63 |
| 2018/0005423 A1 * | 1/2018 | Simmons | ................ G01S 19/42 |
| 2018/0189576 A1 | 7/2018 | Joshi et al. | |

FOREIGN PATENT DOCUMENTS

| | | | |
|---|---|---|---|
| CN | 108226963 A | * | 6/2018 |
| JP | 2958020 B2 | * | 10/1999 |
| JP | 2006260849 A | * | 9/2006 |
| JP | 4328173 B2 | * | 9/2009 |
| JP | 2018512819 A | * | 5/2018 |
| KR | 20130049351 A | * | 9/2006 |
| WO | 2018212859 A1 | | 11/2018 |

OTHER PUBLICATIONS

English translation of CN 107064974 A (Year: 2022).*
English translation of CN 108226963 A (Year: 2022).*
English translation of CN 101194143 B (Year: 2022).*
English translation of JP 4328173 B2 (Year: 2022).*
English translation of JP 2958020 B2 (Year: 2022).*
International Search Report and Written Opinion—PCT/US2020/070712—ISA/EPO—dated Feb. 10, 2021.

* cited by examiner

CAMERA-BASED GNSS ENVIRONMENT DETECTOR

BACKGROUND

Mobile phones, vehicles, and other modern mobile devices often use position information to provide various types of functionality. Often times, these devices will use Global Navigation Satellite Systems (GNSS), such as Global positioning system (GPS) and/or similar satellite-based positioning technologies to obtain this positioning information. Problematically, however, the performance of GNSS drastically degrades if large parts of the sky are obstructed. This therefore occurs frequently in urban environments where large buildings often obstruct parts of the sky, causing GNSS to provide far less accurate positioning information. This less accurate positioning information, in turn, can result in poor functionality of mobile devices.

These positioning errors in GNSS may be largely due to multipath errors in received satellite signals. That is, satellite signals may reflect off buildings or other objects and can travel a much longer path to the mobile device, resulting in significant positioning errors. Detecting and excluding (or otherwise de-weighting) multipath signals from positioning or location determinations may therefore be necessary for good positioning performance in urban scenarios and other scenarios prone to multipath errors. Current techniques for identifying and excluding multipath signals in a GNSS-based position determination, however, are often not reliable.

BRIEF SUMMARY

Techniques described herein address these and other issues by obtaining an image, from a camera, of obstructions in the mobile device's environment where the obstructions block the view of the sky from the perspective of the mobile device. Orientation information regarding the camera can then be used to determine where, in the image, the horizon is situated, and which portions of the sky are blocked by the obstructions from the perspective of the mobile device. Information regarding the location of satellites in the sky can then be obtained, based on an estimated position of the mobile device. Obstructed satellites can then be identified by comparing the location of the satellites with the portions of the sky that are blocked. This information can then be used in a GNSS position determination to disregard or de-weight any information received from the obstructed satellites. In some embodiments, the information regarding the blocked portions of the sky can be sent to a server and shared with other nearby mobile devices.

An example method of satellite selection for GNSS position determination of a mobile device, according to the description, comprises obtaining an image, taken by a camera, of one or more obstructions obstructing a view of at least a portion of the sky from a perspective of the mobile device, obtaining orientation information indicative of the orientation of the camera when the image was taken, and determining, based on the orientation information, a location of the horizon within the image. The method further comprises determining, based on the location of the horizon within the image and a location of the one or more obstructions within the image, one or more obstructed portions of the sky, wherein the one or more obstructed portions of the sky are obstructed by the one or more obstructions. The method also comprises determining, based on an estimated position of the mobile device, locations of a plurality of satellite vehicles (SVs) in the sky, from the perspective of the mobile device, determining, based on the locations of the plurality of SVs and the one or more obstructed portions of the sky, one or more obstructed SVs of the plurality of SVs, obtaining satellite information from each SV of the plurality of SVs; and making the GNSS position determination of the mobile device. Making the GNSS position determination comprises disregarding or de-weighting the respective satellite information obtained from each of the one or more obstructed SVs.

An example mobile device, according to the description, comprises a GNSS receiver, a memory, and one or more processing units communicatively connected with the GNSS receiver and the memory. The one or more processing units is configured to obtain an image, taken by a camera, of one or more obstructions obstructing a view of at least a portion of the sky from a perspective of the mobile device, obtain orientation information indicative of the orientation of the camera when the image was taken, determine, based on the orientation information, a location of the horizon within the image, and determine, based on the location of the horizon within the image and a location of the one or more obstructions within the image, one or more obstructed portions of the sky, where the one or more obstructed portions of the sky are obstructed by the one or more obstructions. The one or more processing units is further configured to determine, based on an estimated position of the mobile device, locations of a plurality of satellite vehicles (SVs) in the sky, from the perspective of the mobile device, determine, based on the locations of the plurality of SVs and the one or more obstructed portions of the sky, one or more obstructed SVs of the plurality of SVs, obtain, from the GNSS receiver, satellite information from each SV of the plurality of SVs, and make a GNSS position determination of the mobile device, wherein, to make the GNSS position determination, the one or more processing units is configured to disregard or de-weight the respective satellite information obtained from each of the one or more obstructed SVs.

An example device, according to the description, comprises means for obtaining an image, taken by a camera, of one or more obstructions obstructing a view of at least a portion of the sky from a perspective of a mobile device, means for obtaining orientation information indicative of the orientation of the camera when the image was taken, means for determining, based on the orientation information, a location of the horizon within the image, and means for determining, based on the location of the horizon within the image and a location of the one or more obstructions within the image, one or more obstructed portions of the sky, where the one or more obstructed portions of the sky are obstructed by the one or more obstructions. The example device further comprises means for determining, based on an estimated position of the mobile device, locations of a plurality of satellite vehicles (SVs) in the sky, from the perspective of the mobile device, means for determining, based on the locations of the plurality of SVs and the one or more obstructed portions of the sky, one or more obstructed SVs of the plurality of SVs, means for obtaining satellite information from each SV of the plurality of SVs, and means for making a GNSS position determination of the mobile device. Making the GNSS position determination comprises disregarding or de-weighting the respective satellite information obtained from each of the one or more obstructed SVs.

An example non-transitory computer-readable medium, according to the description, has instructions stored thereby for satellite selection for GNSS position determination of a mobile device. The instructions, when executed by one or more processing units, cause the one or more processing units to obtain an image, taken by a camera, of one or more obstructions obstructing a view of at least a portion of the sky from a perspective of the mobile device, obtain orientation information indicative of the orientation of the camera when the image was taken, determine, based on the orientation information, a location of the horizon within the image, and determine, based on the location of the horizon within the image and a location of the one or more obstructions within the image, one or more obstructed portions of the sky, wherein the one or more obstructed portions of the sky are obstructed by the one or more obstructions. The instructions, when executed by one or more processing units, further cause the one or more processing units to determine, based on an estimated position of the mobile device, locations of a plurality of satellite vehicles (SVs) in the sky, from the perspective of the mobile device, determine, based on the locations of the plurality of SVs and the one or more obstructed portions of the sky, one or more obstructed SVs of the plurality of SVs, obtain satellite information from each SV of the plurality of SVs, and make the GNSS position determination of the mobile device, wherein making the GNSS position determination comprises disregarding or de-weighting the respective satellite information obtained from each of the one or more obstructed SVs.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
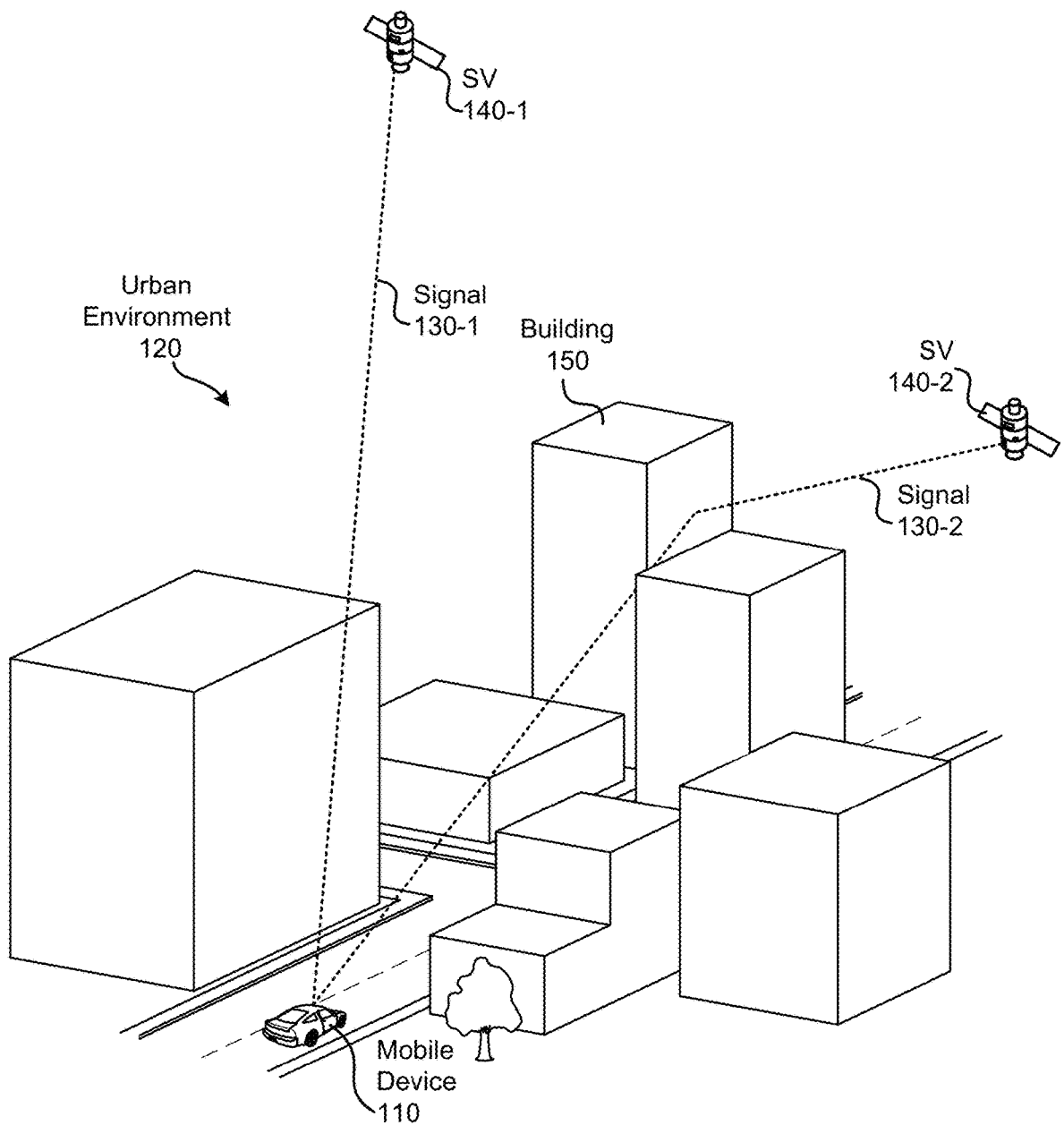
FIG. 1 is a simplified illustration provided to help illustrate the problem of multipath in urban environments.

FIG. 1 is a simplified illustration provided to help illustrate the problem of multipath in urban environments (or other environments in which a view of the sky from the perspective of a mobile device may be similarly obstructed). Here, a mobile device 110 (a vehicle, in this example) is traveling in an urban environment 120. To determine a position of the mobile device 110, the mobile device 110 is equipped with a GNSS receiver capable of receiving radio frequency (RF) signals 130-1 and 130-2 (collectively and generically referred to as signals 130) from corresponding satellite vehicles (SVs) 140-1 and 140-2 (collectively and generically referred to as SVs 140). Because the first signal 130-1 from the first SV 140-1 travels directly from the SV 140-1 to the mobile device 110, the first signal 130-1 can be reliably used by the GNSS receiver to provide an accurate position determination (also referred to herein as a "GNSS position fix") for the mobile device 110. On the other hand the second signal 130-2, with is transmitted from a second SV 140-2 is obstructed from direct view by the mobile device 110, experiences multipath by reflecting off of a building 150, following an indirect route to the mobile device 110 from the second SV 140-2. As noted, because this indirect route is longer than a direct route, the GNSS receiver at the mobile device 110 may conclude the second SV 140-2 is further away, and generate a less accurate position determination than if the second signal 130-2 did not experience multipath. The resulting position determination may be off by many meters from the actual position of the mobile device 110, even if the determination is also based on the first signal 130-1. This can be highly problematic for applications requiring a high degree of accuracy for the position determination, such as automated vehicle driving and navigation.

It can be noted that the scenario illustrated in FIG. 1 is greatly simplified, as a person of ordinary skill in the art will appreciate. Signals from an unobstructed SV (e.g., first SV 140-1) for example, may still experience multipath by traveling both direct and indirect paths to the mobile device 110. However, multipath in these instances (in which a direct-path signal is detected) may be somewhat easy to correct. Thus, as generally referred to herein, the term "multipath" refers to signals from obstructed SVs (e.g., signal 130-2 from 140-2) that take an indirect route to the mobile device 110.

Embodiments described herein address these and other issues by determining, from an image of the environment of the mobile device 110 taken at or near the location of the mobile device 110, portions of the sky that are obstructed by buildings 150 and/or other obstructions. To determine the portions of the sky that are obstructed, orientation information of the camera that took the image can be used to determine where the horizon would be located within the image. As opposed to other techniques that create and/or use a 3D model of obstructions to determine the location of obstructions with respect to the location of the mobile device, the techniques provided herein do not require a 3D model, and therefore may be easier and quicker to implement (requiring, for example, less processing, fewer images, and fewer measurements). Additional details are provided in FIGS. 2-9 and in the following description.

When a mobile device 110 determines to make a GNSS position fix (e.g., when requested by an application executed by the mobile device, a remote device communicatively coupled therewith, etc.), the mobile device 110 may activate a GNSS receiver to gather information from SVs 140 to determine a GNSS position fix. As noted, embodiments can further use image information to determine SVs 140 that may be obstructed. And thus, information received from the obstructed SV use 140 may be de-weighted or disregarded in the GNSS position fix.

According to some embodiments, various different triggering conditions may cause a mobile device to obtain an image for use in this type of enhanced GNSS position fix. That is, although embodiments provided herein may always be used by a mobile device, many mobile devices are limited by power and/or processing budgets that may not allow this type of ubiquitous usage. And thus, many mobile devices may be more selective in capturing images for this type of use.

According to some embodiments, the techniques provided herein for enhanced GNSS position fix using an image may be used when it is determined that the mobile devices in a challenging environment. For instance, some embodiments may trigger the capture of an image based on an estimated position of the mobile device being in a location known to have many obstructions. If (based on a previous GNSS position fix, or other types of position determination techniques) the mobile device determines it is in or near a portion of a large city with many skyscrapers, for example, the mobile device may automatically capture an image to be used for the techniques provided herein automatically. Additionally or alternatively, the mobile device may begin capturing signals from SVs 140 and determine that many obstructions are likely nearby based on the quality and/or power of one or more of the signals.

According to some embodiments, an additional triggering condition may comprise the mobile device determining that a camera may be capable of capturing an image of nearby obstructions. For a mobile device comprising a mobile phone, for instance, the camera used to obtain the image may comprise a camera integrated into the mobile phone. Thus, if the mobile phone determines that it is in a pocket, purse, or other location in which the camera is likely to be obstructed (e.g., based on orientation, movement, proximity detection, and/or other information), the mobile phone may not capture an image. On the other hand, if the mobile phone determines that the camera is being held in a user's hand or otherwise being positioned in a way that would likely give the camera a view of nearby obstructions, the mobile phone may determine to capture an image.

Figure 2:
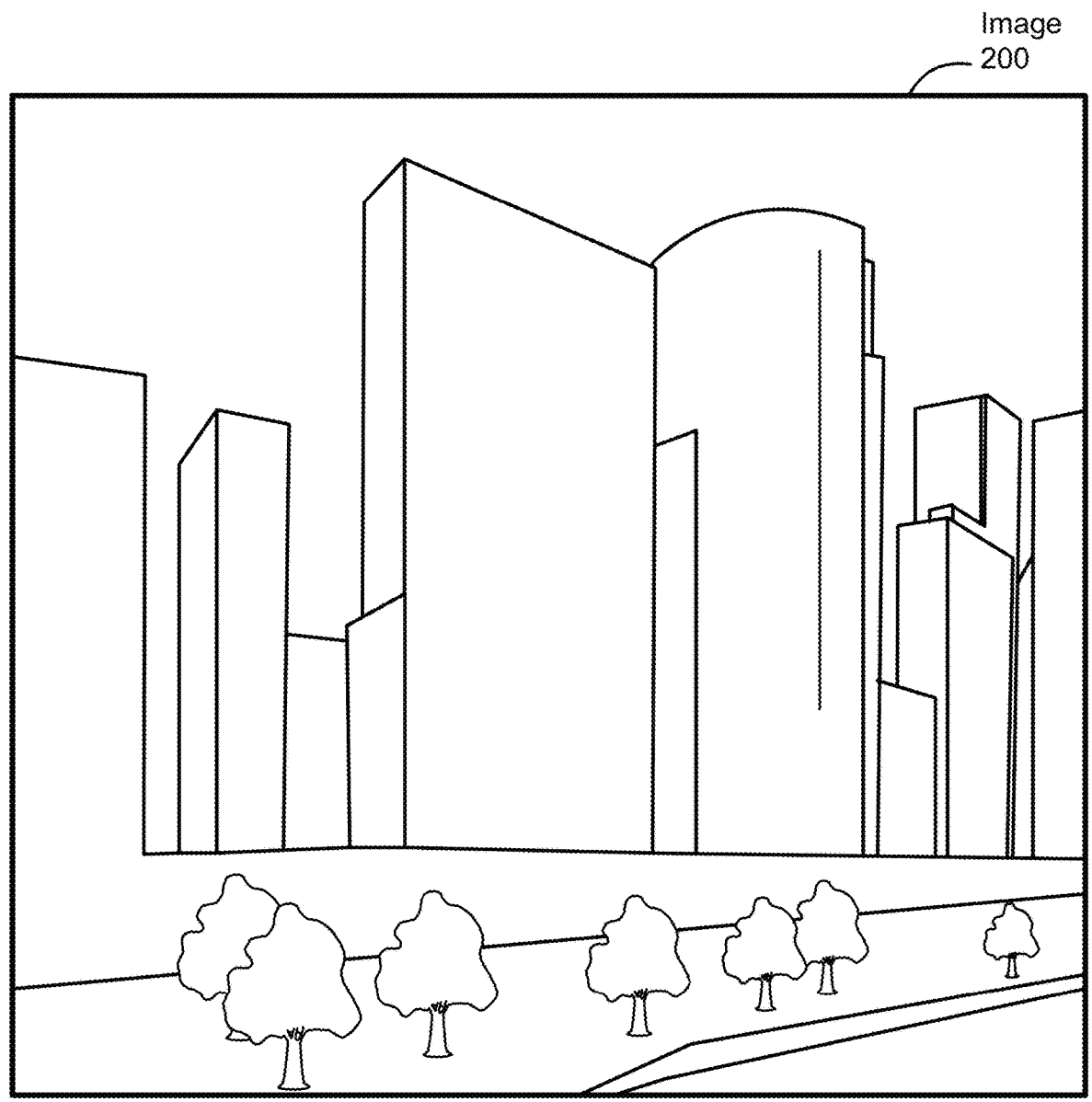
FIG. 2 is an illustration of an example image obtained by a mobile device.

FIG. 2 is an illustration of an example image 200 obtained by a mobile device. Depending on desired functionality, mobile device type, and/or other factors, the image 200 may be obtained in any of a variety of ways. As noted, for a mobile device comprising a mobile phone, the camera may be integrated into the mobile phone. For a mobile device comprising a vehicle, the camera may be one of several cameras disposed throughout the vehicle. They can be further noted that, although the camera may be integrated into, disposed on, and/or otherwise coupled with the mobile device, embodiments are not so limited. As a person of ordinary skill in the art will appreciate, mobile device may obtain a camera image from a nearby device communicatively coupled with the mobile device. Such a nearby device may include a wearable device (e.g., smart glasses, smart watches, smart hats, etc.) and/or other device capable of capturing images and providing the images to the mobile device.

To help ensure applicability of the data from the image 200 to a GNSS position fix, the image 200 may be taken at a location at or near the mobile device, at substantially the location at which the GNSS position fix is to be made. According to some embodiments, a mobile device may disregard the image 200 and/or capture a new image if it is determined (e.g., by an accelerometer, gyroscope, and/or other motion sensors) that a location of the mobile device has changed beyond a threshold amount from the location at which the image 200 was captured. Additionally or alternatively, a mobile device may disregard the image 200 and/or capture a new image if a threshold amount of time has passed since the image 200 was taken. This can help embodiments take into account moving obstructions (e.g., a nearby truck that may temporarily obstruct SV signals).

In some instances, the image 200 may be one of several images taken by one or more cameras at (or near) the location of the mobile device. For mobile phones or vehicles having multiple cameras, for instance, an image may be taken from each of them to provide information regarding nearby obstructions in different respective directions. Further, in instances where the Field Of View (FOV) of one camera overlaps with the FOV of another, images may be "stitched" together and processed (to determine the location of obstructions captured therein) jointly, or processed separately and later combined.

Furthermore, in a variety of characteristics in the image 200 used in the embodiments provided herein may vary, depending on the capabilities of the camera from which the image 200 is captured. For example, the FOV of the image may vary (e.g., some cameras may capture 360° views, others may include fisheye lenses capturing a wide angle FOV, others may have narrower FOVs), as can the resolution, aspect ratio, color spectrum (color, black-and-white, infrared, etc.) and the like. Additionally, specific images 200 may vary in brightness, sharpness, and/or other image features.

Figure 3:
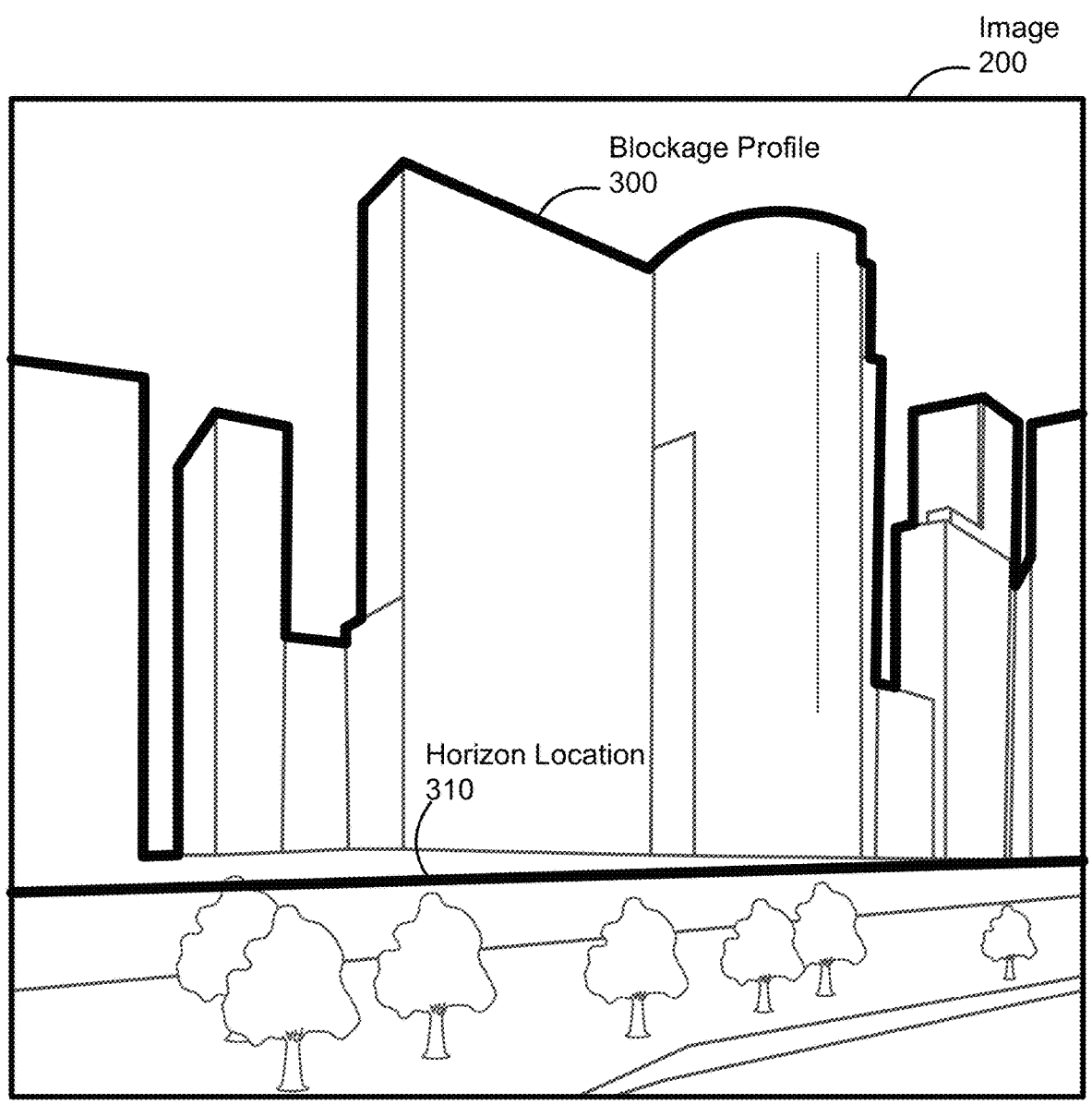
FIG. 3 is an illustration showing features of the image of FIG. 2 that can be extracted or otherwise determined from the image to determine which satellite vehicles (SVs) may be blocked from view of the mobile device.

FIG. 3 is an illustration showing features of the image 200 that can be extracted or otherwise determined from the image to determine which SVs may be blocked from view of the mobile device. For example, image processing circuitry (e.g., a microprocessor or general processing unit, for example) can be used to process the image 200 to extract a blockage profile 300 of the obstructions captured in the image. Generally put, the blockage profile 300 may comprise a border between one or more obstructions in the view of the image and the sky.

The determination of the blockage profile 300 can be made in any of a variety of ways, depending on desired functionality. According to some embodiments, for example, edge detection can be used to identify edges defining the blockage profile 300. In urban applications, embodiments may further filter out edges that are not straight (or edges that are not substantially straight for a threshold length), to identify buildings and other artificial objects (which are more prone to cause multipath for SV signals), while filtering out trees and other natural objects (which are less prone to cause multipath). Utilizing edge detection in this manner can be more efficient than other image processing techniques for determining the blockage profile 300, and therefore may be particularly helpful in embodiments with relatively low processing and/or power budgets for GNSS position determination. That said, other embodiments may use more advanced image processing techniques where processing and/or power budgets allow, such as object detection or the like.

As also indicated in FIG. 3, the horizon location 310 may also be identified for the image 200. That is, although the horizon itself may not be visible in the image 200, a location for the horizon 310 may be identified for the image, indicating where, within the image, the horizon would be located. This can be used later for mapping purposes, as described in more detail below. The horizon location 310 can be determined based on orientation information (e.g., tilt, yaw, and roll) of the camera at the time the image 200 was taken and the FOV of the image 200. In embodiments for which the camera may have a fixed orientation relative to the mobile device (e.g., where the camera is integrated into a mobile phone, in a fixed location on a vehicle, etc.) this orientation information may be determined from one or more orientation sensors (e.g., magnetometers accelerometers, gyroscopes, etc.) of the mobile device.

In some embodiments, orientation information may additionally include corrections made by using map information, in instances where the position estimate of the mobile device (and camera capturing the image 200) allow. In particular, although the pitch and roll of the camera may be accurately determined by accelerometer information (and thus the horizon location 310 may be determined accurately), the yaw (or bearing) of the camera may be less accurate. This can be due to the fact that magnetometer information used to determine the yaw may be more subject to error. (Magnetometers may be prone to errors, for example, when exposed to certain nearby metals.) But in some embodiments, map information may be used, together with the blockage profile 300 from the image, to more correctly determine the yaw of the image.

Figure 4:
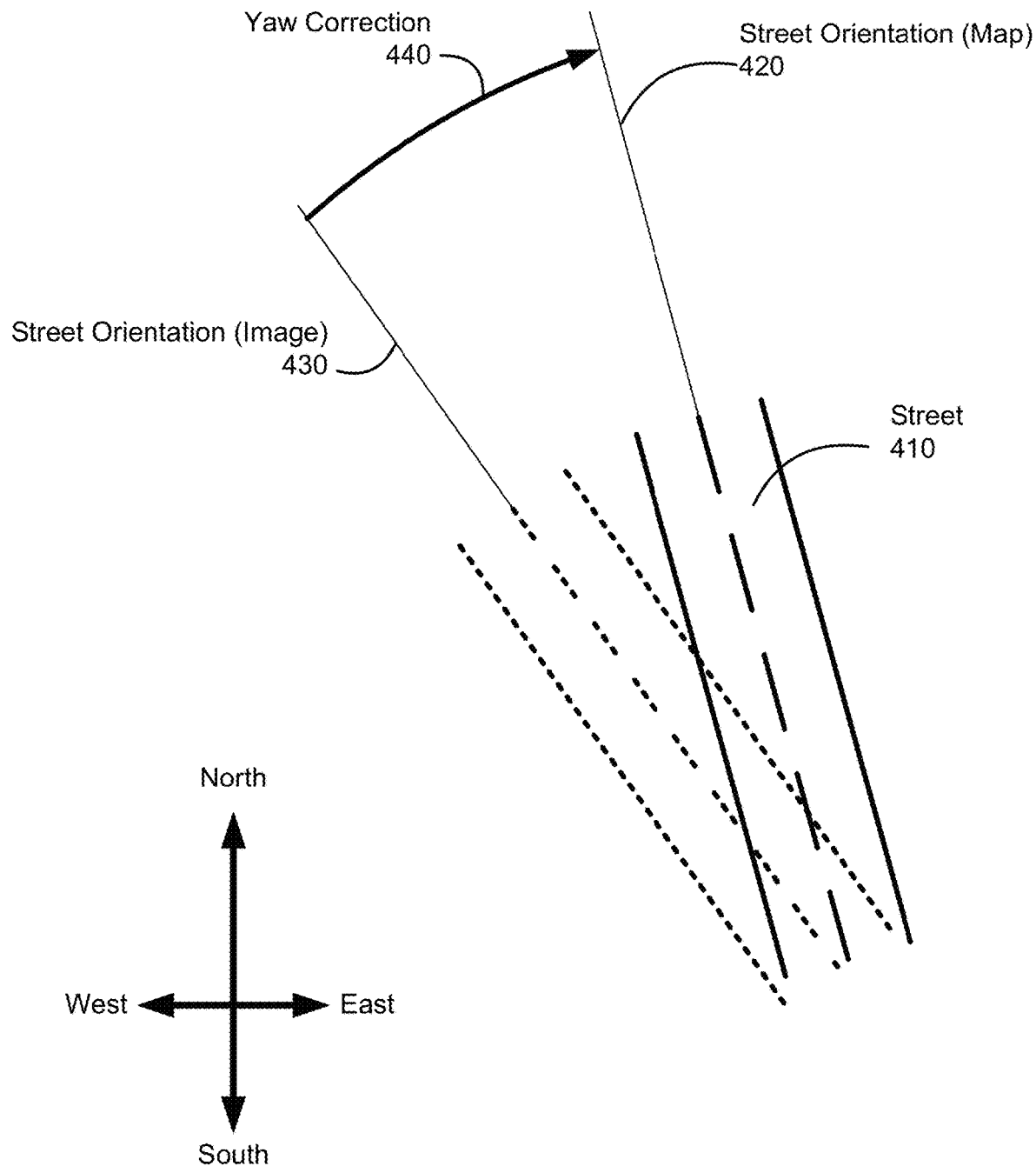
FIG. 4 is an illustration of an overhead view of a street, provided to show how map data can be used to help correct yaw information associated with an image, according to some embodiments.

FIG. 4 is an illustration of an overhead view of a street 410, provided to show how map data can be used to help correct yaw information associated with an image 200, according to some embodiments. The street orientation (map) 420 comprises the true orientation of the street 410, which may be derived from map data of the area in which the mobile device is located. The street orientation (image) 430 comprises an orientation of the street, as derived from an image (e.g., image 200 of FIGS. 2 and 3) and information for the camera at the time the image was captured. That is, according to some embodiments, an orientation for an image may be derived from orientation information regarding the camera at the time the images captured. Additionally, the street 410 may be identified within a blockage profile derived from the image, because streets typically result in a reduced amount of obstruction along the path of the street. Thus, a street may be identified from a blockage profile of a picture, for example, as having a threshold width and being within a threshold distance of the horizon location (in contrast with the height of the blockage profile caused by buildings). The street orientation (image) 430 can then be estimated based on the estimated orientation of the image and the determined location of the street within the image. According to embodiments, this street orientation (image) 430 can then be compared with the street orientation (map) 420 obtained from a map of the estimated location of the mobile device, and, if there is a discrepancy, yaw correction 440 can be made. The correction may comprise aligning the street orientation (image) 430 with the street orientation (map) 420, then adjusting the estimated orientation for the camera based on the yaw correction 440.

It can be noted that such yaw correction may not be limited to matching and observed street orientation (street orientation (image) 430) with orientation from a map (street orientation (map) 420). According to some embodiments, for instance, yaw (or other types of orientation) correction may be made by identifying and orientation of one or more landmarks in an image (e.g., an orientation of a single landmarks, or the relative position of two or more landmarks) determining a relative position of the landmarks to each other and/or to the camera, and matching the relative position of the landmarks to known positions in a map.

Additionally or alternatively, embodiments may calibrate orientation sensors to help ensure accurate orientation. That is, by ensuring proper calibration, yaw correction 440 may be minimized. Such embodiments may include, for example, a GNSS-calibrated inertial measurement unit (IMU) in which the orientation of the IMU is calibrated using GNSS-based measurements.

Returning again to FIG. 3, once the blockage profile 300 of the obstructions captured in the image 200 is determined, along with the horizon location 310 and an accurate determination of the orientation of the camera when the image 200 was taken, this information then can be used to determine which portions of the sky (and ultimately which SVs) are obstructed from the perspective of the mobile device (where the location of the mobile device is approximated as the location of the camera). This can be done, for example, using a SkyPlot (or other form of representing a view of the sky from the perspective of the mobile device) as provided in the following description.

Figure 5:
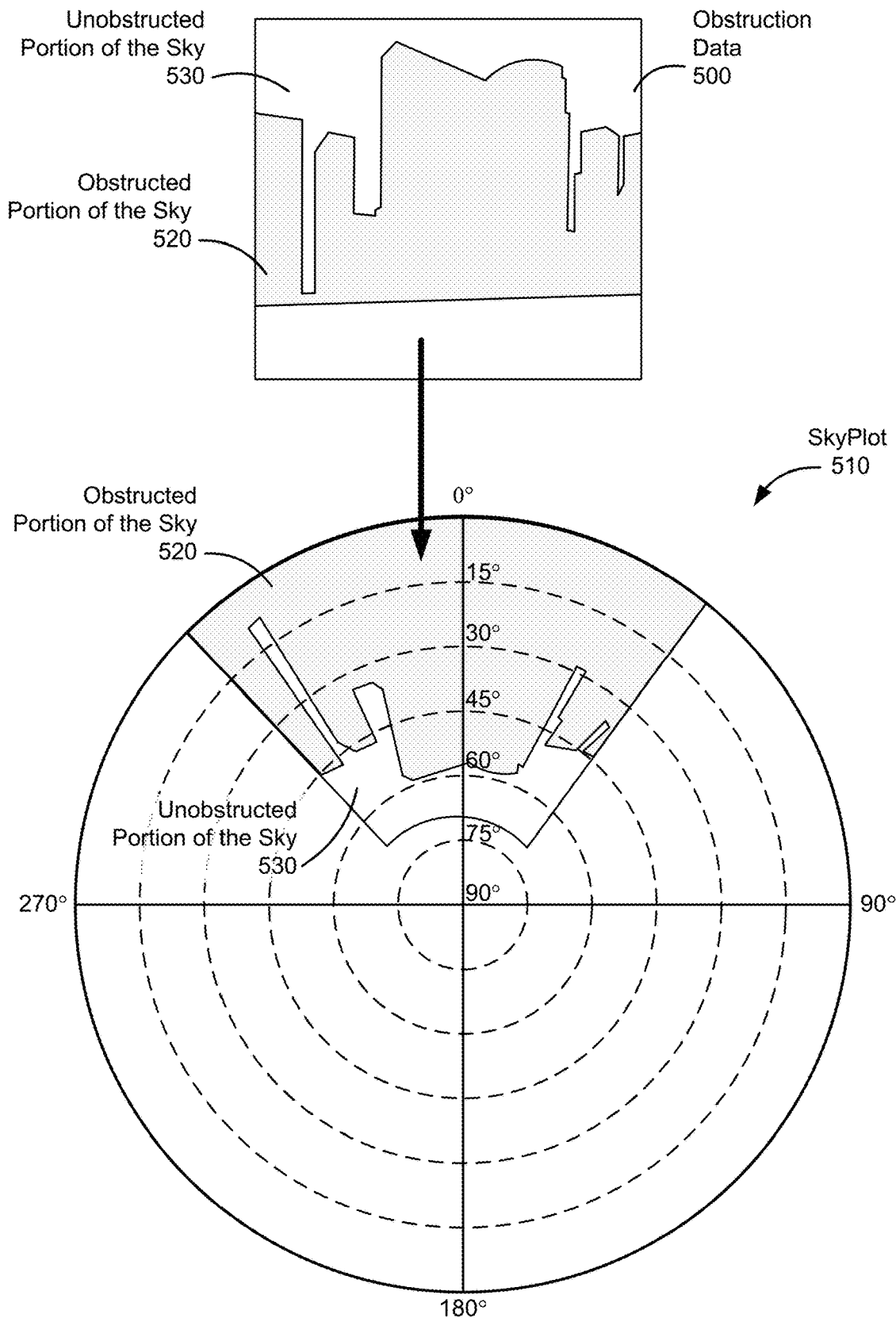
FIG. 5 is an illustration of how obstruction data derived from the image can be mapped to a SkyPlot representing a view of the sky from the perspective of the mobile device, according to an embodiment.

FIG. 5 is an illustration of how obstruction data 500 derived from the image 200 can be mapped to a SkyPlot 510 representing a view of the sky from the perspective of the mobile device. As a person of ordinary skill in the art will appreciate, the SkyPlot 300 indicates azimuth along the circumference of the SkyPlot 510 (labeled 0°, 90°, 180°, and 270°), and elevation within the SkyPlot itself (labeled 0°, 15°, 30°, 45°, 60°, 75°, and 90°). Here, the obstruction data 500 can be representative of the blockage profile 300 and horizon location 310 obtained from the image 200, such that the obstructed portion of the sky 520 from the image data 500 can be represented on the SkyPlot 510, where the horizon location 310 is aligned with the 0° elevation line (outer perimeter) of the SkyPlot 510. Unobstructed portions of the sky 530, too, may be represented on the SkyPlot 510 as illustrated.

Figure 6:
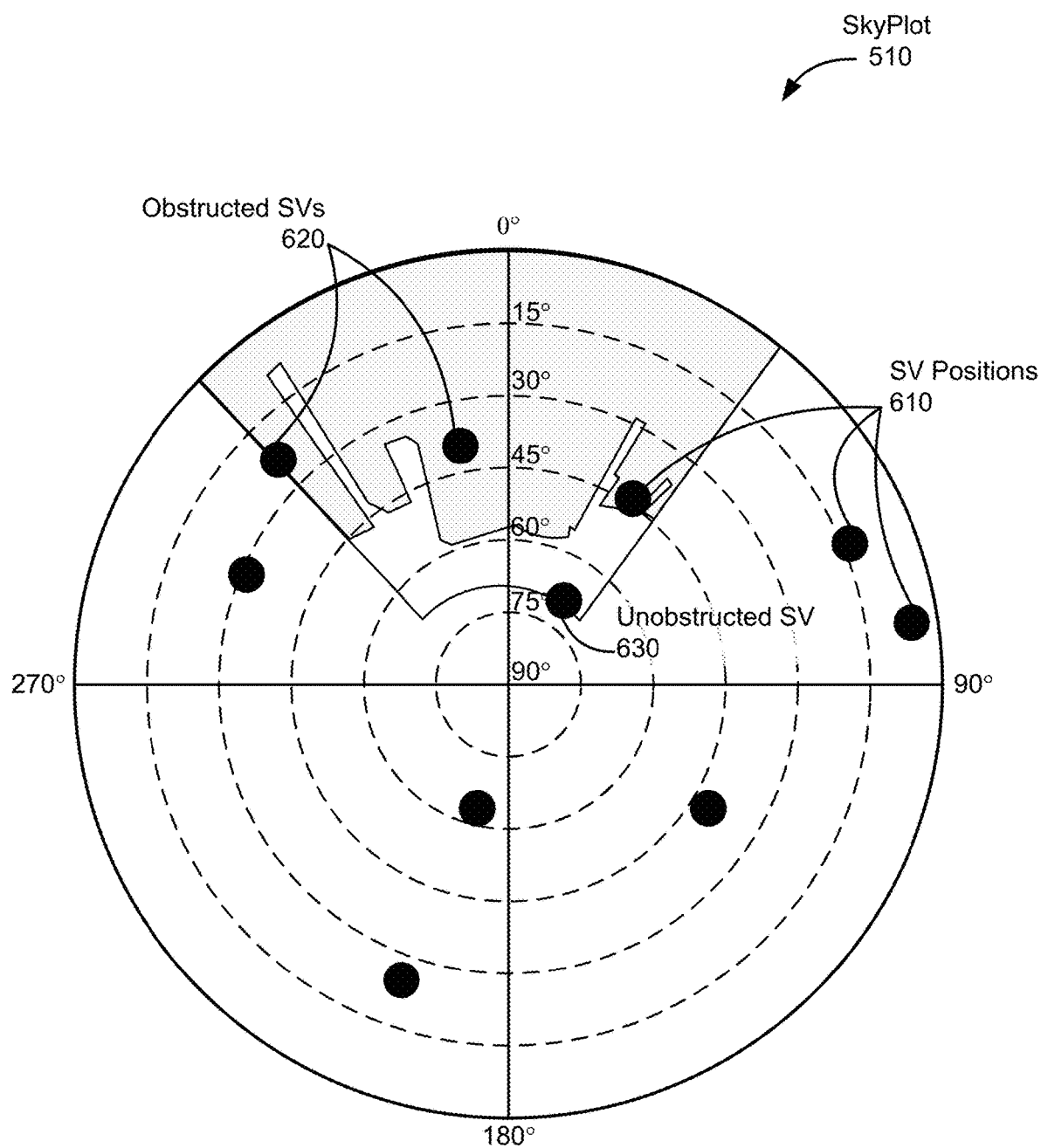
FIG. 6 is an illustration of the SkyPlot of FIG. 5 with SV positions (from the perspective of the mobile device) plotted thereon.

FIG. 6 is an illustration of the SkyPlot 510 with SV positions 610 (from the perspective of the mobile device) plotted thereon. (SV positions 610 are represented by black dots on the SkyPlot 510. For purposes of clarity, and to avoid clutter, only a portion of SV positions 610 have been labeled in FIG. 6.) The SV positions 610 can be determined by the mobile device (or a server or other device in communication there with) using SV orbital data and the estimated position of the mobile device. From this information, the elevation and azimuth of various SVs can be determined, relative to the mobile device.

With the obstruction data 500 to the SkyPlot 510 and providing an indication of obstructed and unobstructed portions of the sky for at least a portion of the SkyPlot 510, obstructed and unobstructed SVs can be determined. As illustrated in FIG. 6, for example, the image data indicates multiple obstructed SVs 620. With this information, the mobile device can determine to disregard or de-weight information received from the obstructed SVs 620 when making a GNSS position determination for the mobile device, because any such signals are likely to have experienced multipath and may therefore reduce the accuracy of the GNSS position determination.

According to embodiments, information from SVs at other SV positions 610, may be treated differently. In some embodiments, for instance, an unobstructed SV 630 may be positively identified as such. Any information received from the unobstructed SV 630 may therefore be given full weight in a GNSS position determination for the mobile device. As for SVs that are not identified (using the image data) as being obstructed or unobstructed may be given a default amount of weight. In some embodiments, any data received from SVs not determined to be obstructed or unobstructed may be given full weight, as if the SV is not obstructed. In other embodiments, these SVs may be given a weight of less than an unobstructed SV 630.

The SkyPlot 510 (or equivalent representation of the sky) therefore may be represented to accommodate these different embodiments. That is, for embodiments treating SV data in a binary manner (e.g., de-weighting or disregarding data from obstructed SVs 620 while treating data received from all other SVs similarly), the SkyPlot 510 may simply represent the sky as being (1) blocked or (2) unblocked/unknown. For embodiments in which data from SVs for which it is not known whether they are obstructed may be weighted differently than obstructed SVs 620 or an unobstructed SV 630, the SkyPlot 510 may represent various portions of the sky as being (1) blocked, (2) unblocked, or (3) unknown. In some embodiments, obstructions from data in addition to the image data SkyPlot 510 may be used to provide a more complete determination of surrounding obstructions. This can include, for instance, obstruction data from other mobile devices.

To this end, some embodiments may provide for crowd-sourcing of obstruction data 500. That is, once a mobile device may send the obstruction data 500 (or image or other data from which the obstruction data was derived), to a server which can save the obstruction data 500 and share it with other mobile devices, when needed. For instance, if a mobile device determines it will make a GNSS position fix, it may (in addition or as an alternative to capturing an image and performing the techniques for obstruction detection described herein) send its estimated position to the server. (Depending on desired functionality, it may also send an explicit request for obstruction data.) In response, the server can send the mobile device obstruction data for the estimated location of the mobile device, which was received by other mobile devices at that estimated location. This may also be helpful where a mobile device is unable to obtain image data (e.g., because the mobile device does not have access to a camera, a camera of the mobile device is determined to be obstructed or inoperable, etc.) Additionally or alternatively, mobile devices in communication with each other (either directly or via a data communication network) may share obstruction information directly with each other, after determining they are within a threshold distance from one another (and the obstruction information may therefore be applicable).

Figure 7:
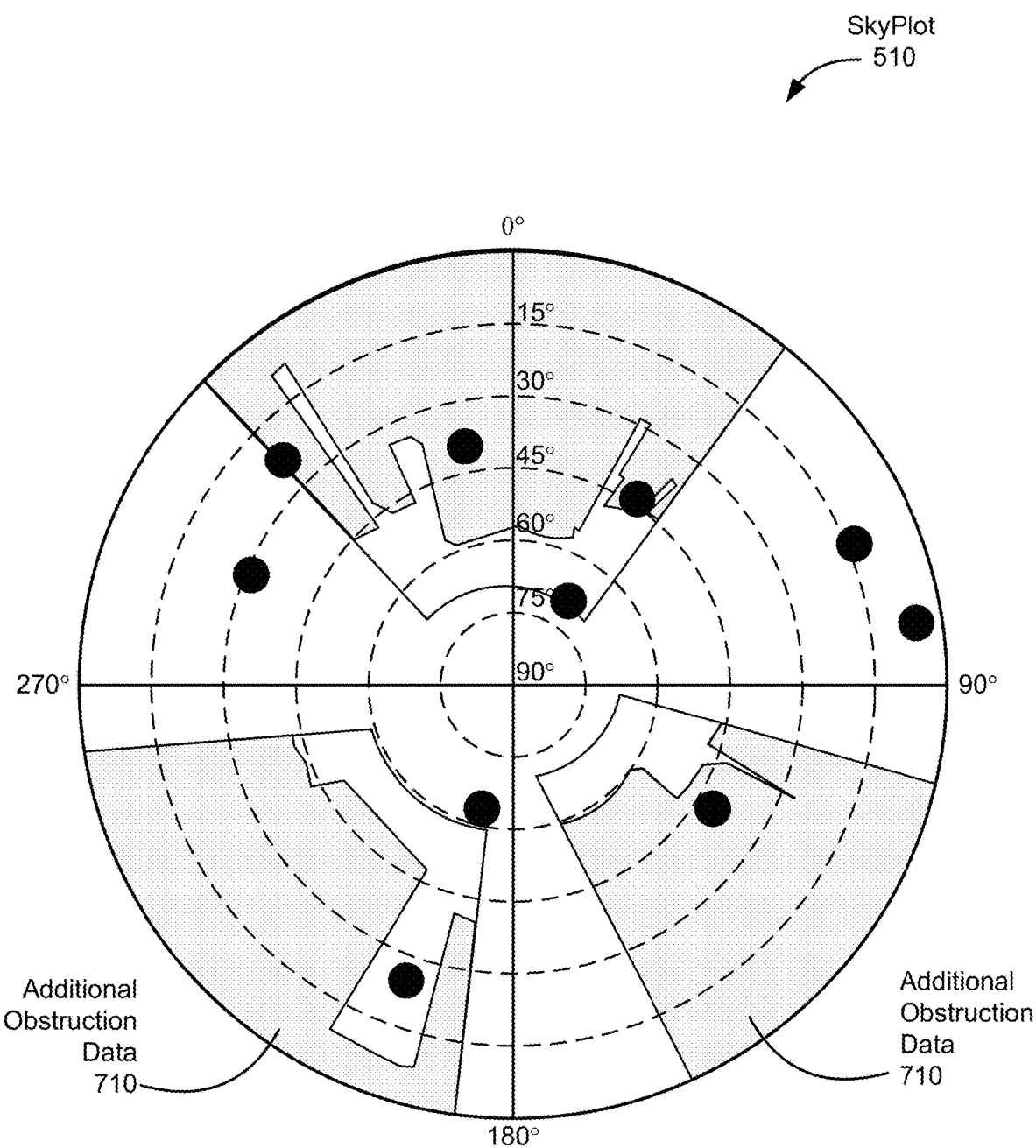
FIG. 7 is an example SkyPlot, showing how additional obstruction data may be applied to the example SkyPlot shown in FIGS. 5 and 6.

FIG. 7 is an example SkyPlot 510, showing how additional obstruction data 710 may be applied to the example SkyPlot shown in FIGS. 5 and 6. The additional obstruction data 710 may have been received by the server from other mobile devices at the estimated location of the mobile device requesting the obstruction data. Moreover, according to some embodiments, the mobile device may indicate one or more locations in a SkyPlot for which obstruction data is requested. As can be seen, the additional obstruction data 710 can be used to provide the mobile device with a more complete representation of nearby obstructions. This more complete representation can, in turn, allow the mobile device to make a more accurate GNSS position determination.

The way in which the server collects and distributes obstruction data may vary, depending on desired functionality. For instance, according to some embodiments, the server may create a SkyPlot for a particular location based on obstruction data received from multiple mobile devices (and/or other image or obstruction data sources). In some embodiments, the server may only map a blockage profile to the SkyPlot after receiving the same (or similar) profiles from multiple devices, which can help filter out temporary obstructions (e.g., vehicles, temporary mobile or immobile structures, etc.). Similarly, the server may remove a blockage profile in the SkyPlot if the blockage profile fails to match blockage profiles received in a threshold amount of obstruction data (allowing the server to update the SkyPlot to accommodate new structures and other blockage profile changes).

Although information regarding obstructed SVs can be used for weighting data received from SVs for GNSS position determination as described herein, embodiments may utilize this information for additional or alternative purposes. For example, according to some embodiments, the priority of updating measurements from SVs may be based on this information. For example, measurements of signals from SVs determined to be unobstructed may be updated before measurements taken from obstructed SVs and/or from SVs that are not determined to be obstructed or unobstructed.

Figure 8:
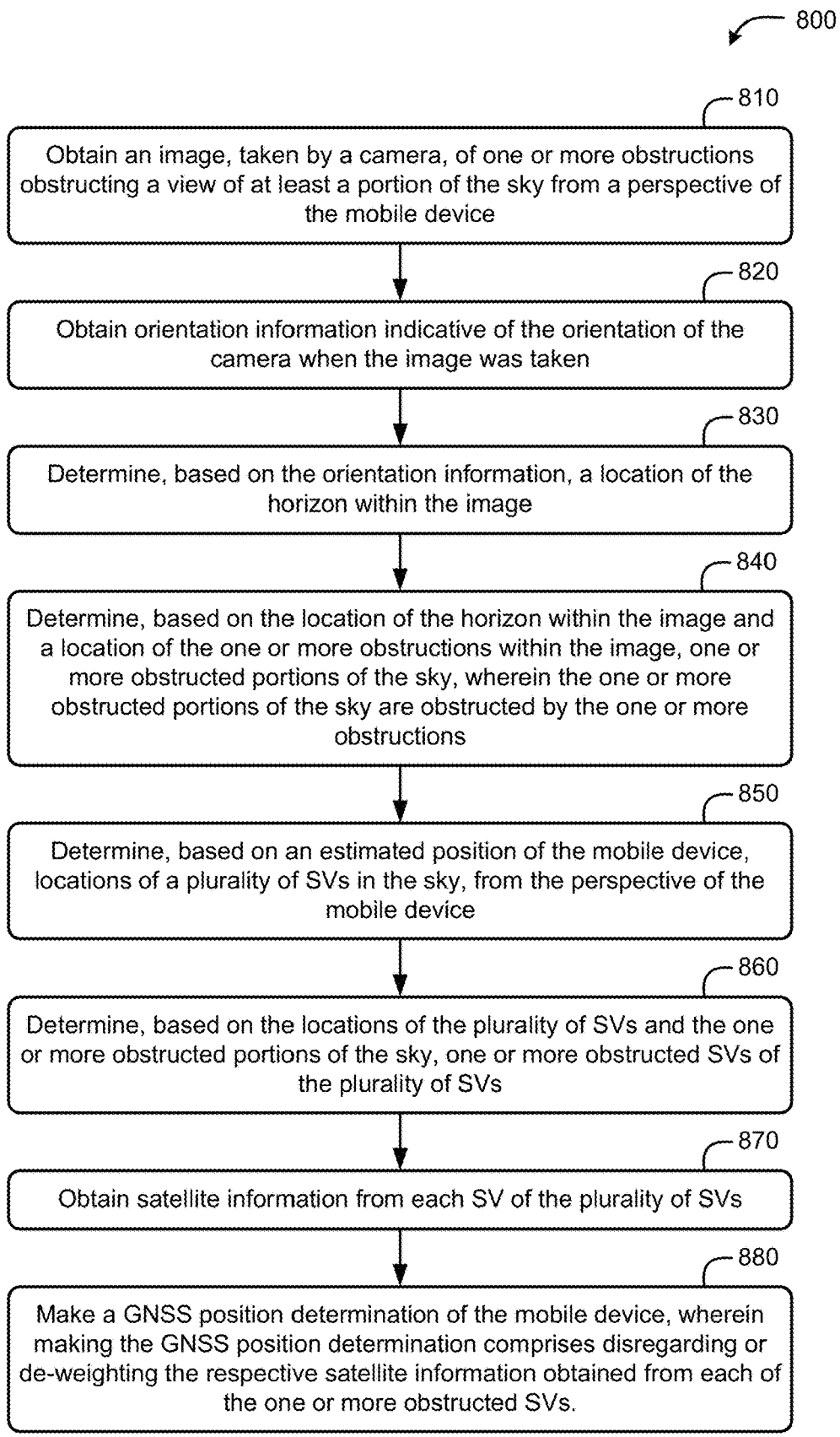
FIG. 8 is a flow diagram of a method of satellite selection for GNSS position determination of a mobile device, according to an embodiment.
Figure 9:
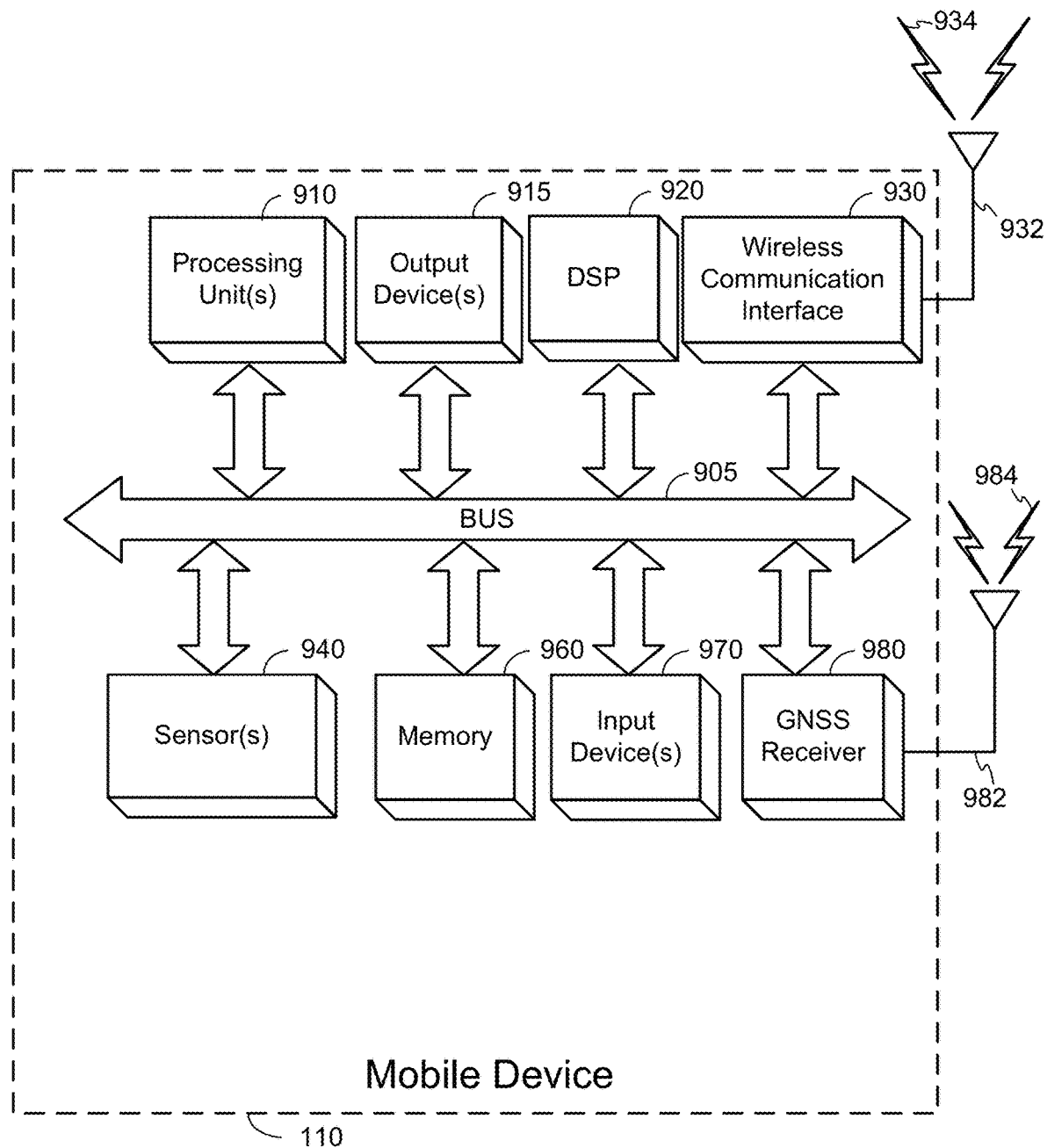
FIG. 9 is a block diagram of an embodiment of a mobile device.

FIG. 8 is a flow diagram of a method 800 of satellite selection for GNSS position determination of a mobile device, according to an embodiment. The method 800 may therefore represents one embodiment in which the above techniques may be performed by a mobile device. Means for performing the various functions illustrated in the blocks of FIG. 8 may comprise hardware and/or software elements of a mobile device, an example of which is shown in FIG. 9 and described in more detail below.

At block 810, the functionality includes obtaining an image, taken by a camera, of one or more obstructions obstructing a view of at least a portion of the sky from a perspective of the mobile device. As noted in the above-described embodiments, the camera may be integrated into the mobile device and/or at a location near the mobile device to have a similar perspective of the sky. Additionally or alternatively, the image may comprise any of a variety of image types and formats. Moreover, the image may be one of many images, which may be "stitched" together. As noted, in some embodiments, the camera is integrated into the mobile device, and the mobile device comprises a mobile phone or a vehicle. In other embodiments, the mobile device may comprise other types of electronic devices, which may or may not have the camera integrated therein. In some embodiments, obtaining the image at block 810 may be based on a triggering event. Thus, according to some embodiments, the functionality at block 810 may be responsive to detecting a FOV of the camera includes the horizon, a signal quality of one or more signals from the plurality of SVs is below the threshold signal quality, signal power of one or more signals from the plurality of SVs is below a threshold signal power, or the estimated position of the mobile devices in an area predetermined to have obstructions, or any combination thereof.

Means for performing the functionality at block 810 may include one or more software and/or hardware components of a mobile device. These components may include, for example, a bus 905, processing unit(s) 910, wireless communication interface 930, sensor(s) 940 (which may include the camera, as discussed below), memory 960, input device(s) 970, and/or other software and/or hardware components of a mobile device 110 as illustrated in FIG. 9 and described in more detail below.

The functionality at block 820 comprises obtaining orientation information indicative of the orientation of the camera when the image was taken. Depending on desired functionality, this information may comprise a high-level, 6 Degrees Of Freedom (6DOF) description of camera orientation and/or raw sensor data from which the orientation information may be derived. Raw sensor data may include data from motion sensors, such as magnetometers, accelerometers, gyroscopes comments etc.

As noted, orientation information may be based (at least in part) on map information of an area in which the mobile device is estimated to be in. As described above with regard to FIG. 4, for instance, a yaw (bearing) of the camera can be corrected by identifying and orientation of a street and making any corrections based on map data for the street. Thus, according to some embodiments, the method 800 may further comprise determining, from the image, the orientation of a street. Obtaining the orientation information may therefore further comprise correcting the data from the one or more orientation sensors based on a comparison of the orientation of the street from the image with map data of the street.

Means for performing the functionality at block 820 may include one or more software and/or hardware components of a mobile device. These components may include, for example, a bus 905, processing unit(s) 910, wireless communication interface 930, sensor(s) 940 (which may include the camera, as discussed below), memory 960, input device(s) 970, and/or other software and/or hardware components of a mobile device 110 as illustrated in FIG. 9 and described in more detail below.

At block 830, the functionality includes determining, based on the orientation information, a location of the horizon within the image. As previously noted, given the orientation information for the camera, and known information regarding the FOV of the camera, a location for the horizon can be located within the image (even if the horizon is obscured by one or more obstructions). As indicated in the above-describes techniques, identifying the location of the horizon can help determine an elevation angle of a blockage profile of one or more obstructions captured in the image, which can be mapped to and/or otherwise represented by a SkyPlot.

Means for performing the functionality at block 830 may include one or more software and/or hardware components of a mobile device. These components may include, for example, a bus 905, processing unit(s) 910, memory 960, sensor(s) 940, input device(s) 970, and/or other software and/or hardware components of a mobile device 110 as illustrated in FIG. 9 and described in more detail below.

At block 840, the functionality comprises determining, based on the location of the horizon within the image and a location of the one or more obstructions within the image, one or more obstructed portions of the sky, wherein the one or more obstructed portions of the sky are obstructed by the one or more obstructions. Again, the location of the horizon within the image can help in the determination of which portions of the sky are obstructed. In some embodiments, determining the one or more obstructed portions of the sky may comprise determining, from the image, a profile of the one or more obstructions. This profile (e.g., a blockage profile as shown in FIG. 300) may be determined using image processing of the image may be determined by using edge detection and/or other image processing techniques to process the image obtained at block 810, and may indicate a boundary between the sky and the obstructions.

As noted in the embodiments described previously, the one or more obstructed portions of the sky may be further determined based on information received by a server. That is, additional obstruction data may be obtained from a server (which, in turn, may have obtained or determined obstruction data from information received by other mobile devices at or near the estimated location of the mobile device), and the additional obstruction data may be used to determine one or more additional obstructed portions of the sky, which may fall outside the FOV of the image obtained at block 810.

Means for performing the functionality at block 840 may include one or more software and/or hardware components of a mobile device. These components may include, for example, a bus 905, processing unit(s) 910, memory 960, and/or other software and/or hardware components of a mobile device 110 as illustrated in FIG. 9 and described in more detail below.

The functionality of block 850 comprises determining, based on an estimated position of the mobile device, locations of a plurality of SVs in the sky, from the perspective of the mobile device. As previously noted, this may comprise using known orbital data for SVs to determine a SkyPlot in which SV positions are determined with respect to azimuth and elevation angles, from the perspective of the mobile device. As a person of ordinary skill in the art will appreciate, the azimuth angles of the SkyPlot may be provided with respect to the position of the mobile device (e.g., where 0° represents the bearing of the mobile device) or an separate coordinate frame (e.g., an East-North-Up (ENU) reference frame where 0° represents true north). In the latter case, the orientation of the mobile device with respect to the separate coordinate frame can then be taken into account to determine the SV positions in the sky from the perspective of the mobile device. Because orbital data may be time-dependent, determining the approximate locations of a plurality of SVs from the perspective of the mobile device may be further based on a timestamp of the image obtained at block 810 and/or similar timing information.

The estimated position of the mobile device may be obtained in any of a variety of ways, depending on desired functionality, mobile device capabilities, and/or other factors. The estimated position may, for instance, comprise a rough initial location estimate based on positioning techniques that are not based on obtaining a new GNSS position fix. The estimated position of the mobile device may therefore be determined using a coarse position based on a previously-obtained GNSS position fix, Wi-Fi-based positioning, cellular-based positioning, or dead reckoning, or any combination thereof.

Means for performing the functionality at block 850 may include one or more software and/or hardware components of a mobile device. These components may include, for example, a bus 905, processing unit(s) 910, memory 960, GNSS receiver 980, and/or other software and/or hardware components of a mobile device 110 as illustrated in FIG. 9 and described in more detail below. In some embodiments, the wireless communication interface 930 may include a Wi-Fi and/or cellular transceiver configured to perform positioning based on signals received and/or transmitted by the Wi-Fi and/or cellular transceiver (e.g. positioning based on cell-ID, enhanced cell-ID, OTDOA using PRS signals, etc.).

At block 860, the method 800 comprises determining, based on the locations of the plurality of SVs and is the one or more obstructed portions of the sky, one or more obstructed SVs of the plurality of SVs. This may be done by using techniques such as those described above with regard to FIGS. 5-7, using a SkyPlot or similar techniques to compare the location of obstructed portions of the sky with the location of SVs (from the perspective of the mobile device). In some embodiments, where the location of an SV is within a threshold distance from the boundary between an obstruction and the sky, the respective SV may be identified as being close to the line of sight for the mobile device. In embodiments where a position estimation engine performing the GNSS position determination is more nuanced, it may be capable of handling and processing such information to provide more accurate results.

Means for performing the functionality at block 860 may include one or more software and/or hardware components of a mobile device. These components may include, for example, a bus 905, processing unit(s) 910, memory 960, and/or other software and/or hardware components of a mobile device 110 as illustrated in FIG. 9 and described in more detail below.

At block 870, satellite information is obtained from each SV of the plurality of SVs. This can include satellite information from SVs that are determined (from block 860) as being obstructed, and therefore prone to multipath error. Satellite information may also include information received from unobstructed SVs and/or SVs for which a determination of whether they are obstructed has not been made.

Means for performing the functionality at block 870 may include one or more software and/or hardware components of a mobile device. These components may include, for example, a bus 905, processing unit(s) 910, memory 960, GNSS receiver 980, and/or other software and/or hardware components of a mobile device 110 as illustrated in FIG. 9 and described in more detail below.

The functionality at block 880 comprises making a GNSS position determination of the mobile device, wherein making the GNSS position determination comprises disregarding or de-weighting the respective satellite information obtained from each of the one or more obstructed SVs. As previously noted, the GNSS position determination may be made by a positioning engine that may be executed by a processing unit. Whether satellite information received by obstructed satellites is de-weighted or disregarded may be dependent on the type of GNSS position determination algorithms executed by the positioning engine. In either case, obstructed SVs may be given less weight than SVs determined to be unobstructed. In some embodiments, SVs that have not been determined to be obstructed or unobstructed may be given a "default" weight.

Means for performing the functionality at block 880 may include one or more software and/or hardware components of a mobile device. These components may include, for example, a bus 905, processing unit(s) 910, memory 960, and/or other software and/or hardware components of a mobile device 110 as illustrated in FIG. 9 and described in more detail below.

As noted, embodiments may further enable crowdsourcing of obstruction data. Accordingly, the method 800 of FIG. 8 may, in some embodiments, include sending information indicative of the one or more obstructed portions of the sky and a location of the mobile device (e.g., the estimated position of the mobile device and/or the location determined by the GNSS position determination) to a server. The server can then subsequently send the information to other mobile devices at or near the location of the mobile device to determine the location of obstructions for satellite selection for a GNSS position determination. Although this information may be used to create a "flat" model that re-creates obstructions at certain locations, according to some embodiments, a server may use the obstruction information gathered from mobile devices to create a 3D model of the obstructions in that area.

FIG. 9 illustrates an embodiment of a mobile device 110, which can be utilized as described herein above (e.g. in association with FIGS. 1-8). For example, the mobile device 110 can perform one or more of the functions of method 800 of FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations (e.g., disposed at different locations of a vehicle).

The mobile device 110 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 9, some embodiments may have a separate Digital Signal Processor (DSP) 920, depending on desired functionality. Location determination and/or other determinations based on wireless communication may be provided in the processing unit(s) 910 and/or wireless communication interface 930 (discussed below). The mobile device 110 also can include one or more input devices 970, which can include without limitation a keyboard, touch screen, a touch pad, microphone, button(s), dial(s), switch(es), and/or the like; and one or more output devices 915, which can include without limitation a display, light emitting diode (LED), speakers, and/or the like.

The mobile device 110 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the mobile device 110 to communicate data (e.g., to/from a server for crowdsourcing, as described herein) via the one or more data communication networks. The communication can be carried out via one or more wireless communication antenna(s) 932 that send and/or receive wireless signals 934.

Depending on desired functionality, the wireless communication interface 930 may comprise separate transceivers to communicate terrestrial transceivers, such as wireless devices, base stations, and/or access points. The mobile device 110 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as CDMA2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ Long-Term Evolution (LTE), LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or Wireless Personal Area Network (WPAN).

The mobile device 110 can further include sensor(s) 940. Sensors 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances. In some embodiments, one or more cameras included in the sensor(s) 940 may be used to obtain the image as described in the embodiments presented herein. Additionally or alternatively, inertial sensors included in the sensor(s) 940 may be used to determine the orientation of the camera and/or mobile device, as described in the embodiments above.

Embodiments of the mobile device 110 may also include a GNSS receiver 980 capable of receiving signals 984 from one or more GNSS satellites (e.g., SVs 140) using an antenna 982 (which could be the same as antenna 932). Positioning based on GNSS signal measurement can be utilized to complement and/or incorporate the techniques described herein. The GNSS receiver 980 can extract a position of the mobile device 110, using conventional techniques, from GNSS SVs of a GNSS system (e.g., SVs 140 of FIG. 1), such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The mobile device 110 may further include and/or be in communication with a memory 960. The memory 960 can include, without limitation, local and/or network accessible storage, a disk drive, a drive array, an optical storage device, a solid-state storage device, such as a Random Access Memory (RAM), and/or a Read-Only Memory (ROM), which can be programmable, flash-updateable, and/or the like. Such storage devices may be configured to implement any appropriate data stores, including without limitation, various file systems, database structures, and/or the like.

The memory 960 of the mobile device 110 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the mobile device 110 (and/or processing unit(s) 910 or DSP 920 within mobile device 110). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a (RAM), a Programmable ROM (PROM), Erasable Programmable Read-Only Memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of satellite selection for Global Navigation Satellite System (GNSS) position determination of a mobile device, the method comprising:
   obtaining an image, taken by a camera, of one or more obstructions obstructing a view of at least a portion of a sky from a perspective of the mobile device;
   obtaining orientation information indicative of an orientation of the camera when the image was taken;
   determining, based on the orientation information, a location of a horizon within the image;
   determining, based on the location of the horizon within the image and a location of the one or more obstructions within the image, one or more obstructed portions of the sky, wherein the one or more obstructed portions of the sky are obstructed by the one or more obstructions;
   determining, based on an estimated position of the mobile device, locations of a plurality of satellite vehicles (SVs) in the sky, from the perspective of the mobile device;
   determining, based on the locations of the plurality of SVs and the one or more obstructed portions of the sky, one or more obstructed SVs of the plurality of SVs;
   obtaining satellite information from each SV of the plurality of SVs; and
   making the GNSS position determination of the mobile device, wherein making the GNSS position determination comprises disregarding or de-weighting the respective satellite information obtained from each of the one or more obstructed SVs,
   wherein obtaining the image is responsive to detecting:
   a Field Of View (FOV) of the camera includes the horizon.

2. The method of claim 1, wherein determining the one or more obstructed portions of the sky comprises determining, from the image, a profile of the one or more obstructions.

3. The method of claim 1, further comprising sending, to a server, information indicative of:
   the one or more obstructed portions of the sky, and
   a location of the mobile device based on the GNSS position determination.

4. The method of claim 1, wherein the orientation information is based on data from one or more orientation sensors of the mobile device.

5. The method of claim 4, further comprising determining, from the image, an orientation of a street, and wherein obtaining the orientation information further comprises correcting the data from the one or more orientation sensors based on a comparison of the orientation of the street from the image with map data of the street.

6. The method of claim 1, wherein determining one or more obstructed SVs is further based on information indicative of one or more additional obstructed portions of the sky received from a server.

7. The method of claim 1, wherein the camera is integrated into the mobile device, and the mobile device comprises:
   a mobile phone, or
   a vehicle.

8. The method of claim 1, further comprising determining the estimated position of the mobile device using:
   a coarse position based on a previously-obtained GNSS position fix,
   Wi-Fi-based positioning,
   cellular-based positioning, or
   dead reckoning, or
   any combination thereof.

9. The method of claim 1, further comprising:
   determining whether the camera is capable of capturing an image of nearby obstructions.

10. A mobile device comprising:
    a Global Navigation Satellite System (GNSS) receiver;
    a memory; and
    one or more processing units communicatively connected with the GNSS receiver and the memory, and configured to:
    obtain an image, taken by a camera, of one or more obstructions obstructing a view of at least a portion of a sky from a perspective of the mobile device;
    obtain orientation information indicative of an orientation of the camera when the image was taken;
    determine, based on the orientation information, a location of a horizon within the image;
    determine, based on the location of the horizon within the image and a location of the one or more obstructions within the image, one or more obstructed portions of the sky, wherein the one or more obstructed portions of the sky are obstructed by the one or more obstructions;
    determine, based on an estimated position of the mobile device, locations of a plurality of satellite vehicles (SVs) in the sky, from the perspective of the mobile device;

determine, based on the locations of the plurality of SVs and the one or more obstructed portions of the sky, one or more obstructed SVs of the plurality of SVs;

obtain, from the GNSS receiver, satellite information from each SV of the plurality of SVs; and make a GNSS position determination of the mobile device, wherein, to make the GNSS position determination, the one or more processing units is configured to disregard or de-weight the respective satellite information obtained from each of the one or more obstructed SVs, wherein the one or more processing units is configured to obtain the image responsive to detecting a triggering event comprising:

a Field Of View (FOV) of the camera includes the horizon.

11. The mobile device of claim 10, wherein, to determine the one or more obstructed portions of the sky, the or more processing units is configured to determine, from the image, a profile of the one or more obstructions.

12. The mobile device of claim 10, wherein the one or more processing unit is further configured to send, to a server, information indicative of:
the one or more obstructed portions of the sky, and
a location of the mobile device based on the GNSS position determination.

13. The mobile device of claim 10, further comprising one or more orientation sensors, wherein the one or more processing units is configured to obtain the orientation information based on data from the one or more orientation sensors.

14. The mobile device of claim 13, wherein the one or more processing units is further configured to determine, from the image, an orientation of a street, and wherein, to obtain the orientation information, the one or more processing units is configured to correct the data from the one or more orientation sensors based on a comparison of the orientation of the street from the image with map data of the street.

15. The mobile device of claim 10, wherein the one or more processing units is configured to determine one or more obstructed SVs further based on information indicative of one or more additional obstructed portions of the sky received from a server.

16. The mobile device of claim 10, further comprising the camera, and wherein the mobile device comprises:
a mobile phone, or
a vehicle.

17. The mobile device of claim 10, wherein the one or more processing units is configured to determine the estimated position of the mobile device using:
a coarse position based on a previously-obtained GNSS position fix,
Wi-Fi-based positioning,
cellular-based positioning, or
dead reckoning, or
any combination thereof.

18. The mobile device of claim 10, wherein, the one or more processing units is further configured to determine whether the camera is capable of capturing an image of nearby obstructions.

19. A device comprising:
means for obtaining an image, taken by a camera, of one or more obstructions obstructing a view of at least a portion of a sky from a perspective of a mobile device;

means for obtaining orientation information indicative of an orientation of the camera when the image was taken;

means for determining, based on the orientation information, a location of a horizon within the image;

means for determining, based on the location of the horizon within the image and a location of the one or more obstructions within the image, one or more obstructed portions of the sky, wherein the one or more obstructed portions of the sky are obstructed by the one or more obstructions;

means for determining, based on an estimated position of the mobile device, locations of a plurality of satellite vehicles (SVs) in the sky, from the perspective of the mobile device;

means for determining, based on the locations of the plurality of SVs and the one or more obstructed portions of the sky, one or more obstructed SVs of the plurality of SVs;

means for obtaining satellite information from each SV of the plurality of SVs; and means for making a Global Navigation Satellite System (GNSS) position determination of the mobile device, wherein making the GNSS position determination comprises disregarding or de-weighting the respective satellite information obtained from each of the one or more obstructed SVs, wherein means for obtaining the image comprises means for obtaining the image responsive to detecting:
a Field Of View (FOV) of the camera includes the horizon.

20. The device of claim 19, wherein the means for determining the one or more obstructed portions of the sky comprise means for determining, from the image, a profile of the one or more obstructions.

21. The device of claim 19, further comprising means for sending, to a server, information indicative of:
the one or more obstructed portions of the sky, and
a location of the mobile device based on the GNSS position determination.

22. The device of claim 19, wherein the means for determining one or more obstructed SVs are configured to determine the one or more obstructed SVs further based on information indicative of one or more additional obstructed portions of the sky received from a server.

23. The device of claim 19, further comprising means for determining the estimated position of the mobile device using:
a coarse position based on a previously-obtained GNSS position fix,
Wi-Fi-based positioning,
cellular-based positioning, or
dead reckoning, or
any combination thereof.

24. The device of claim 19 further comprises means for determining whether the camera is capable of capturing an image of nearby obstructions.

25. A non-transitory computer-readable medium having instructions stored thereby for satellite selection for Global Navigation Satellite System (GNSS) position determination of a mobile device, wherein the instructions, when executed by one or more processing units, cause the one or more processing units to:
obtain an image, taken by a camera, of one or more obstructions obstructing a view of at least a portion of a sky from a perspective of the mobile device;
obtain orientation information indicative of an orientation of the camera when the image was taken;

determine, based on the orientation information, a location of a horizon within the image;

determine, based on the location of the horizon within the image and a location of the one or more obstructions within the image, one or more obstructed portions of the sky, wherein the one or more obstructed portions of the sky are obstructed by the one or more obstructions;

determine, based on an estimated position of the mobile device, locations of a plurality of satellite vehicles (SVs) in the sky, from the perspective of the mobile device;

determine, based on the locations of the plurality of SVs and the one or more obstructed portions of the sky, one or more obstructed SVs of the plurality of SVs;

obtain satellite information from each SV of the plurality of SVs; and make the GNSS position determination of the mobile device, wherein making the GNSS position determination comprises disregarding or de-weighting the respective satellite information obtained from each of the one or more obstructed SVs, wherein the instructions, when executed by one or more processing units, cause the one or more processing units to obtain the image responsive to detecting:

a Field Of View (FOV) of the camera includes the horizon.

26. The non-transitory computer-readable medium of claim 25, wherein the instructions, when executed by the one or more processing units, cause the one or more processing units to determine, from the image, a profile of the one or more obstructions.

27. The non-transitory computer-readable medium of claim 25, wherein the instructions, when executed by the one or more processing units, cause the one or more processing units to send, to a server, information indicative of:
the one or more obstructed portions of the sky, and
a location of the mobile device based on the GNSS position determination.

28. The non-transitory computer-readable medium of claim 25, wherein the instructions, when executed by the one or more processing units, cause the one or more processing units to determine the one or more obstructed SVs further based on information indicative of one or more additional obstructed portions of the sky received from a server.

29. The non-transitory computer-readable medium of claim 25, wherein the instructions, when executed by the one or more processing units, cause the one or more processing units to determine the estimated position of the mobile device using:
a coarse position based on a previously-obtained GNSS position fix,
Wi-Fi-based positioning,
cellular-based positioning, or
dead reckoning, or
any combination thereof.

30. The non-transitory computer-readable medium of claim 25, wherein the instructions, when executed by the one or more processing units, cause the one or more processing units to determine whether the camera is capable of capturing an image of nearby obstructions.

* * * * *